United States Patent [19]
Rogut

[11] Patent Number: 5,328,610
[45] Date of Patent: Jul. 12, 1994

[54] SELF-SUPPORTED LOW PRESSURE DROP HOLLOW FIBER MEMBRANE PANEL AND CONTACTOR MODULE

[75] Inventor: Jan Rogut, Boulder, Colo.

[73] Assignee: Integrated Process Technologies, Boulder, Colo.

[21] Appl. No.: 77,675

[22] Filed: Jun. 15, 1993

[51] Int. Cl.⁵ .............................................. B01D 63/02
[52] U.S. Cl. ............................. 210/321.8; 210/321.89; 210/500.23
[58] Field of Search ........... 210/500.23, 321.8, 321.89, 210/490; 156/166, 250

[56] References Cited

U.S. PATENT DOCUMENTS

| | | | |
|---|---|---|---|
| 2,972,349 | 2/1961 | DeWall | 210/321.8 X |
| 3,342,729 | 9/1967 | Strand | 210/500.23 X |
| 4,639,353 | 1/1987 | Takemura et al. | 422/46 |
| 4,659,549 | 4/1987 | Hamada et al. | 422/48 |
| 4,750,918 | 6/1988 | Sirkar | 55/16 |
| 4,789,468 | 12/1988 | Sirkar | 210/137 |
| 4,959,152 | 9/1990 | Nichols | 210/651 |
| 4,975,247 | 12/1990 | Badolato et al. | 422/48 |
| 5,037,610 | 8/1991 | Fukasawa et al. | 422/48 |
| 5,104,535 | 4/1992 | Cote et al. | 210/321.8 |
| 5,124,127 | 6/1992 | Jones et al. | 422/46 |
| 5,160,615 | 11/1992 | Takagi et al. | 210/321.8 |
| 5,169,529 | 12/1982 | Carroll et al. | 210/321.78 |
| 5,174,900 | 12/1992 | Nichols et al. | 210/651 |

OTHER PUBLICATIONS

Karoor et al., "Gas Absorption Studies in Microporous Hollow Fiber Membrane Modules" *Ind. Eng. Chem. Res.*, 32, 674-704 (1993).

Kreulen et al., "Microporous Hollow Fibre Membrane Modules As Gas Liquid Contractors" Part 1 and Part 2, *J. Membre. Sci.*, 78, 197-216 (1993) IBID. 78, 217-238 (1993).

*Primary Examiner*—Frank Spear
*Attorney, Agent, or Firm*—John R. Flanagan

[57] ABSTRACT

A self-supported low pressure drop hollow fiber membrane panel includes a pair of layers of non-permeable material having opposite external and internal sides, and a multiplicity of hollow fibers of permeable material extending between and in generally transverse relationship to the layers of non-permeable material. Opposite end portions of the hollow fibers are encapsulated by the respective layers of non-permeable material and are open at the external sides thereof. Elongated portions of the hollow fibers have elongated internal bores providing flow communication between the open opposite end portions of the hollow fibers. The elongated portions of the hollow fibers extend between the internal sides of the respective layers of non-permeable material. The lengths of the elongated portions of the hollow fibers are substantially less than each of the length and width dimensions of the layers of non-permeable material. A contactor module for gas-gas, gas-liquid and liquid-liquid mass transfer systems employs the hollow fiber membrane panel.

45 Claims, 4 Drawing Sheets

SELF-SUPPORTED LOW PRESSURE DROP HOLLOW FIBER MEMBRANE PANEL AND CONTACTOR MODULE

CROSS-REFERENCE TO RELATED APPLICATIONS

Reference is hereby made to the following patent applications by the inventor herein:

(1) "Fiber Membrane Elements And Modules And Methods Of Fabrication For Improved Fluid Separation", assigned U.S. Ser. No. 07/961,140, filed Oct. 13, 1992, now U.S. Pat. No. 5,238,566.

(2) "Integrated Hollow Fiber Membrane Permeators And Method Of Fabricating Integrated Permeators", assigned U.S. Ser. No. 08/060,345 and filed May 11, 1993.

(3) "Improved Fiber Membrane Elements And Modules And Methods Of Fabrication For Fluid Separation", assigned U.S. Ser. No. 08/062,574, filed May 17, 1993, now U.S. Pat. No. 5,284,583.

TECHNICAL FIELD

The present invention generally relates to mass transfer intensification and fluid mixture separations using hollow fiber membrane technology and, more particularly, is concerned with a self-supported low pressure drop hollow fiber membrane panel and contactor module.

BACKGROUND ART

There exists a large number of applications of hollow fiber membrane systems wherein large contact area between different phases moving relative to one another and low pressure drop are very important. Some examples are gas-liquid contactors for flue gas treatment and liquid-liquid contactors for waste water treatment as described in U.S. Pat. No. 5,169,529 to Carroll et al, U.S. Pat. Nos. 4,750,918 and 4,789,468 to Sirkar, U.S. Pat. No. 5,104,535 to Cote et al, and U.S. Pat. Nos. 4,959,152 and 5,174,900 to Nichols et al. Other examples are artificial blood oxygenators as described in U.S. Pat. No. 4,639,353 to Takemura et al, U.S. Pat. No. 4,659,549 to Hamada et al, U.S. Pat. No. 4,975,247 to Badolato et al, U.S. Pat. No. 5,037,610 to Fukasawa et al, and U.S. Pat. No. 5,124,127 to Jones et al, and artificial kidneys as described in U.S. Pat. No. 5,160,615 to Takagi et al.

One approach for meeting the low pressure drop requirement is by providing fibers of larger internal diameter but without increasing the outside diameter. But, this approach is detrimental to mechanical strength of the fibers. Another approach for meeting the large contact area is by providing more dense packing of fibers within a given volume. But, this approach is detrimental to uniformity of the flows outside of the fibers.

In natural membrane capillary systems, such as for example in human lungs, the problem of pressure drops of flowing fluids is solved by using extremely short capillaries. For example, the capillaries which supply blood to be contacted with lung sacs have internal diameter as low as seven micrometers but they exhibit low resistance to flow because they are extremely short, being about 100 micrometers in length. This is one of the important reasons why the natural systems are so efficient in mass transfer. Natural membrane capillary systems are good models to emulate in many artificial applications in industrial and medical fields.

No substantial technical problems exist in production of polymer permeable hollow fibers with solid or porous walls which are comparable in size to the capillaries of the natural systems. However, the lung system of mammals is built as a complicated multiple-level tree-like system which progresses from small to larger connecting passages. Heretofore, such natural systems have been viewed as too complex to replicate in artificial designs. Thus, up to the present time the emulation of natural systems has not been viewed by conventional thinking as a practical approach.

DISCLOSURE OF INVENTION

The present invention represents a departure from this conventional thinking by providing a unique design which artificially emulates certain desirable features of the natural system. The unique design of the present invention provides a low pressure drop hollow fiber membrane panel and contactor module which achieves the requirements of low pressure drop and large contact area and versatile flow arrangements.

Underlying and forming a part of the present invention is the discovery that this unique design can be readily provided by relatively small modifications of the long-standing conventional double velvet weaving technology to produce velvet-like fabrics or textiles. The modifications of the present invention to the conventional technology are that, first, the normal facing fibers mounted to the warp and weft fibers in two parallel layers are replaced by permeable hollow fibers and, second, the hollow fibers are not severed across their midpoints as was the case with the normal facing fibers heretofore. The intermediate product from this modified process is a hollow fiber double velvet textile composed of a pair of opposite layers of supporting textile interconnected by a transverse weave of hollow fibers.

The final product is the hollow fiber membrane panel. To arrive at the final product, first, the opposite layers of supporting textile and adjacent portions of the hollow fibers are encapsulated by glue or other non-permeable material to define and seal a flow channel extending between and parallel to the opposite layers of non-permeable material and, second, the portions of the layers of non-permeable material and the hollow fibers are removed to open the internal bores of the hollow fibers to communication with external sides of the layers of non-permeable material. Thus, the hollow fiber membrane panel so constructed includes a pair of substantially parallel layers or walls of non-permeable material and a multiplicity of hollow fibers connected at their opposite ends to the respective walls and extending between and substantially perpendicular to the walls, spacing the walls from one another such that the flow channel is defined between the walls and across the hollow fibers. The lengths of the hollow fibers are substantially less than each of the length and width dimensions of the walls of non-permeable material. Flow passages are also presented through the hollow fibers from and to the opposite external sides of the walls. Mass transfer in the panel takes place by contacting different fluids through the highly extended surface areas of the hollow fiber walls. Because of the extremely high packing density of the hollow fibers the panel itself has a substantially self-supported construction.

Thus, the hollow fiber membrane panel and contactor module constructed therewith of the present invention are applicable for use in gas-liquid contactors for flue gas treatment and liquid-liquid contactors for waste water treatment. Additionally, the hollow fiber membrane panel is applicable to artificial blood oxygenators and artificial kidneys.

Also, the membrane panel design has advantages in other applications, such as low temperature catalytic membrane reactors and membrane bioreactors. By making the hollow fibers from high temperature resistant materials, such as polyetheretherketone (PEEK) and ceramic or metal materials, this membrane panel is useful in applications in conventional high temperature catalytic membrane reactors and in chemical reactors in which high gradients of temperatures between the fluids through the walls of the hollow fibers are applied to regulate selectivity or rate of chemical conversions.

A unique property of the panel design is that due to the short lengths of the hollow fibers the temperature of the fluids inside the fibers does not change significantly so that all hollow fibers function under nearly equal and homogeneous temperature conditions. This unique property also makes it easy to modify the structure and catalytic properties of the hollow fibers, for example, to transform them from polyacrylenitrile material to carbon materials by controlled thermal or chemical carbonization.

Short hollow fibers in membrane panels also make it easy to impregnate by catalytic compounds from inside the hollow fibers which additionally protects from leaching of the expensive components of catalytic systems.

Impregnation can be used to make substantially non-selective fibers selective or to modify the existing selectivity of the fibers.

Accordingly, the present invention is directed to a hollow fiber membrane panel which comprises: (a) a pair of layers of non-permeable material having opposite external and internal sides; and (b) a multiplicity of hollow fibers of permeable material extending between and in generally transverse relationship to the layers of non-permeable material. The layers of non-permeable material can be formed of a plurality of sublayers of different materials or of an adhesive material. Each hollow fibers has a pair of spaced opposite end portions and an elongated portion extending between and interconnecting the opposite end portions. The opposite end portions of the hollow fibers are encapsulated by the respective layers of non-permeable material and are open at the external sides thereof. The elongated portions of the hollow fibers extend between the internal sides of the respective layers of non-permeable material and have elongated internal bores providing flow communication between the open opposite end portions of the hollow fibers. The lengths of the hollow fibers are substantially less than each of the length and width dimensions of the layers of non-permeable material. The elongated portions of each of the hollow fibers has a length falling within a range of from about 0.1 to 5 centimeters and preferably from about 0.1 to 0.5 centimeters.

In one embodiment, a pair of layers of textile material are encapsulated and impregnated separately by the respective layers of non-permeable material. The layers of non-permeable material are supported in a spaced relationship to one another by the elongated portions of the hollow fibers so as to define a flow channel therebetween. The elongated portions of the hollow fibers extend across the flow channel and transversely to the direction of flow through the channel. The layers of textile material are formed of interwoven strands of material.

In another embodiment, a layer of filler material is disposed between the interior sides of the layers of non-permeable material. The layer of filler material supports the layers of non-permeable material in a spaced relationship to one another so as to define the flow channel therebetween. The filler material is permeable to fluid flow through the flow channel. The layer of filler material can include a catalyst bed of material or a bed of bacteria, depending upon the particular application.

More particularly, the hollow fibers can be arranged as individual hollow fibers or as bundles of individual hollow fibers extending generally parallel to one another. The hollow fibers also can be arranged as bundles of individual hollow fibers which are helically twisted about one another. The hollow fibers can be coated with a material which is acceptable for contact with biological fluids. Also, the hollow fibers can be coated with a material which changes surface properties of the fibers or the selectivity of the material of the fibers. The fibers themselves also can have catalytic properties or can be obtained by post-treatment of the fibers.

The present invention is also directed to a contactor module for low pressure gas-gas, gas-liquid and liquid-liquid mass transfer systems. The contactor module comprises: (a) a hollow housing having opposite end portions and opposite side portions extending between and interconnecting the opposite end portions; (b) an inlet port defined through one of the end portions and an outlet port defined through the other of the end portions of the housing; (c) an infeed port defined through one of the side portions and a discharge port defined through the other of the side portions of the housing; and (d) a hollow fiber membrane panel disposed in the housing. The membrane panel includes a pair of layers of non-permeable material having opposite external and internal sides, and a multiplicity of hollow fibers of permeable material extending between and in generally transverse relationship to the layers of non-permeable material. Each hollow fibers has a pair of spaced opposite end portions and an elongated portion extending between and interconnecting the opposite end portions. The opposite end portions of the hollow fibers are encapsulated by the respective layers of non-permeable material and are open at the external sides thereof being disposed in flow communication respectively with the infeed and discharge ports of the housing. The elongated portions of the hollow fibers extend between the internal sides of the respective layers of non-permeable material and have elongated internal bores providing flow communication between the open opposite end portions of the hollow fibers. The lengths of the elongated portions of the hollow fibers are substantially less than each of the length and width dimensions of the layers of non-permeable material.

The layers of non-permeable material are supported in a spaced relationship to one another by the elongated portions of the hollow fibers so as to define a flow channel therebetween disposed in flow communication respectively with the inlet and outlet ports of the housing. The elongated portions of the hollow fibers extend across the flow channel and transversely to the direction of flow through the channel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Figures 1, 2:
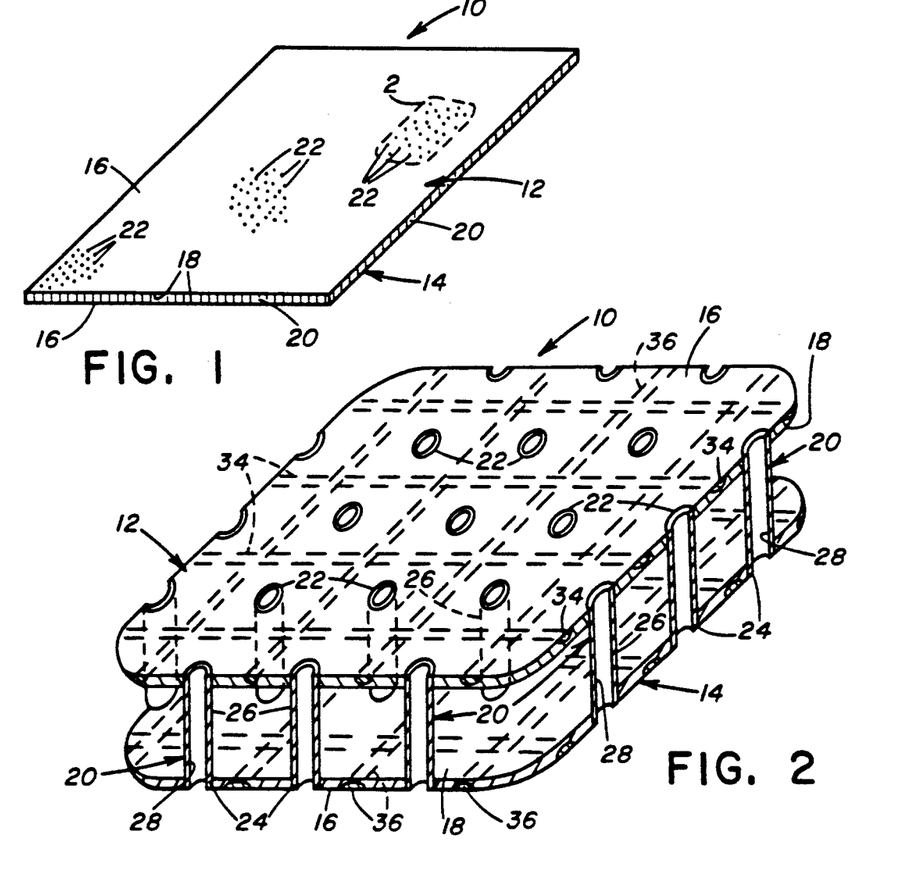
FIG. 1 is a perspective view of a self-supported low pressure drop hollow fiber membrane panel in accordance with the present invention.
FIG. 2 is an enlarged detailed view on an exaggerated scale of a section of the hollow fiber membrane panel enclosed in circle 2 in FIG. 1.

Referring to the drawings, and particularly to FIGS. 1 and 2, there is illustrated a self-supported low pressure drop hollow fiber membrane panel, generally designated 10, having a construction in accordance with the principles of the present invention. Basically, the hollow fiber membrane panel 10 includes a pair of opposite layers 12, 14 of non-permeable material having opposite external and internal sides 16, 18, and a multiplicity of hollow fibers 20 of permeable material extending between and in generally transverse relationship to the layers 12, 14 of non-permeable material. The layers 12, 14 of non-permeable material can be formed of one integral layer or a plurality of sublayers of different materials (see FIG. 6) or of an adhesive material.

Figure 6:
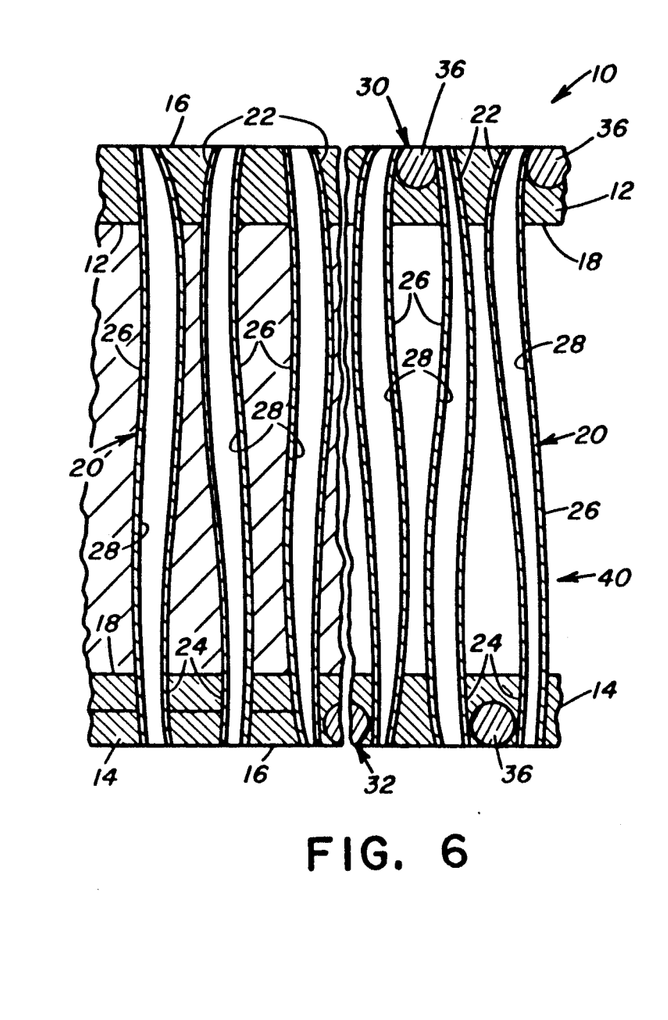
FIG. 6 is an enlarged sectional view of a portion of the hollow fiber membrane panel illustrating the panel after application of layers of glue or adhesive to the opposite ends of the panel and removal of outer portions of the layers of adhesive to expose the bores extending through the hollow fibers.

Referring to FIGS. 2 and 6, each hollow fiber 20 has a pair of spaced opposite end portions 22, 24 and an elongated portion 26 extending between and respectively connecting with the opposite end portions 22, 24. The opposite end portions 22, 24 of the hollow fibers 20 are encapsulated by the respective layers 12, 14 of non-permeable material and are open at the external sides thereof. The elongated portions 26 of the hollow fibers 20 extend between the internal sides 18 of the respective layers 12, 14 of non-permeable material and have elongated internal bores 28 providing flow communication between the open opposite end portions 22, 24 of the hollow fibers 20. As seen in FIGS. 1 and 2, the membrane panel 10 has an overall thin rectangular configuration derives from the lengths of the hollow fibers 20 being substantially less than each of the length and width dimensions of the layers 12, 14 of non-permeable material. The elongated portion 26 of each of the hollow fibers 20 has a length falling within a range of from about 0.1 centimeter to 5.0 centimeters and, preferably, falling within a range of from about 0.1 to 0.5 centimeters. The hollow fibers 20 can be fabricated from any suitable material, such as polymethylpentene, polyethylene, polypropylene, polysulfone, etc.

Figure 3:
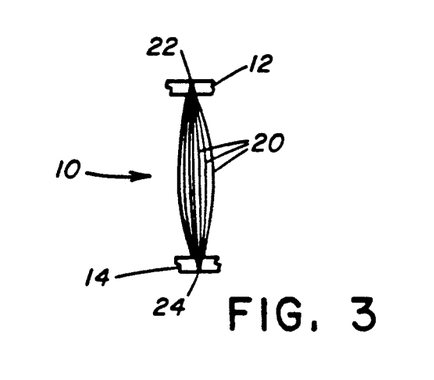
FIG. 3 is an enlarged fragmentary elevational view of the hollow fibers of the membrane panel arranged as bundles of individual hollow fibers extending generally parallel to one another.
Figure 4:
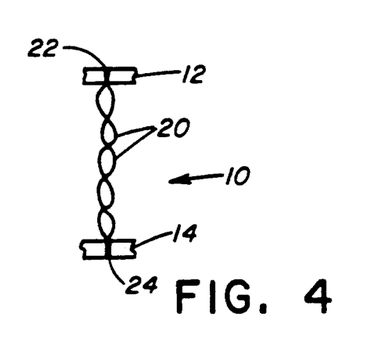
FIG. 4 is an enlarged fragmentary elevational view of the hollow fibers of the membrane panel arranged as bundles of individual hollow fibers helically twisted about one another.

Referring to FIGS. 3 and 4, rather than being arranged as individual hollow fibers, preferably the hollow fibers 20 are provided in either one of two different arrangements. In FIG. 3, the hollow fibers 20 are shown arranged as bundles of individual hollow fibers extending generally parallel to one another. In FIG. 4, the hollow fibers 20 are shown arranged as bundles of individual hollow fibers which are helically twisted about one another. Further, the hollow fibers 20 can be coated with a material which is acceptable for contact with biological fluids. Also, the hollow fibers 20 can be coated with a material which changes surface properties of the fibers or the selectivity of the material of the fibers. Further, the hollow fibers 20 can be coated inside or outside with catalytic materials.

Figure 5:
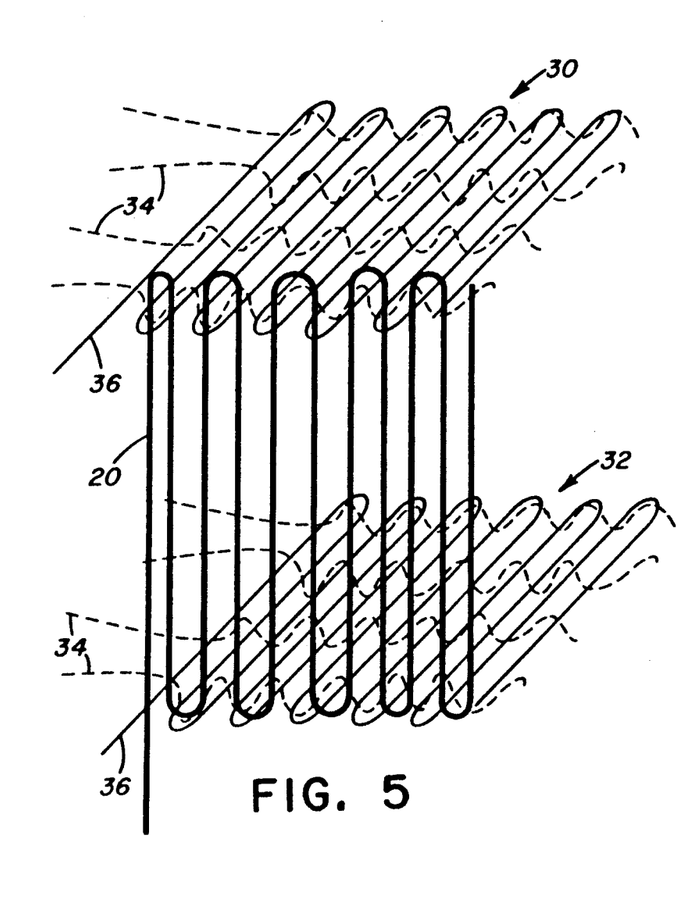
FIG. 5 is a diagrammatic illustration of a double velvet weaving method that can be employed in the manufacture of the hollow fiber membrane panel of the present invention.

FIG. 5 is a diagrammatic illustration of several of the steps of a conventional double velvet weaving method that are employed in the manufacture of the embodiment of the hollow fiber membrane panel 10 of the present invention which employs textile layers 30, 32. As in the double velvet weaving method, the pair of spaced layers 30, 32 of textile consisting of warp and weft fibers 34, 36 are formed concurrently as the hollow fibers 20 are weaved with the warp and weft fibers 34, 36 in transverse relationship to the spaced layers 30, 32. In accordance with the present invention, the conventional velvet weaving method is modified in its application to fabrication of the membrane panel 10 by the substitute of the hollow fibers 20 appropriate for mass transfer applications for the conventional fibers normally employed for fabrication of velvet products and by omitting the step of severing the individual hollow fibers 20 extending between and attached to the spaced outside woven substrate layers 30, 32.

Thus, the modifications to the conventional double velvet weaving technology are that, first, the normal facing fibers mounted to the warp and weft fibers 34, 36 in two parallel layers are replaced by permeable hollow fibers 20 and, second, the hollow fibers 20 are not severed across their midpoints as was the case with the normal facing fibers heretofore. The intermediate product from this modified process is a hollow fiber double velvet textile composed of a pair of opposite layers 30, 32 of supporting textile interconnected by a transverse weave of hollow fibers 20.

FIG. 6 illustrates the final hollow fiber membrane panel 10 after application of coatings 38 of glue or adhesive to the textile layers 30, 32 and removal of outer portions of the glue or adhesive coatings 38 to expose and open the opposite end portions 22, 24 of the hollow fibers 20 and open communication with the internal bores 28 extending through the hollow fibers 20. To arrive at the final product, first, the opposite layers 30, 32 of the supporting textile and adjacent portions of the hollow fibers 20 are encapsulated by the coatings 38 of glue or other non-permeable material to define and seal a flow channel 40 extending between and parallel to the opposite layers 12, 14 of non-permeable material and, second, portions of the layers 12, 14 of non-permeable material and the hollow fibers 20 are removed to open the internal bores 28 of the hollow fibers 20 to communication with external sides 16 of the layers 12, 14 of non-permeable material. Depending upon the particular glue or other non-permeable material used, the layers 12, 14 of non-permeable material can either be flexible or rigid.

More particularly, the right half of FIG. 6 represents one embodiment of the hollow fiber membrane panel 10. In this embodiment, the membrane panel 10 includes the above-mentioned pair of opposite layers 30, 32 of textile material encapsulated and impregnated separately by respective layers 12, 14 of non-permeable material. The layers 12, 14 of non-permeable material are supported in a spaced relationship to one another by the elongated portions 26 of the hollow fibers 20 so as to define the flow channel 40 therebetween. The elongated portions 26 of the hollow fibers 20 extend across the flow channel 40 in transverse relationship to the direction of flow through the channel 40.

The left half of FIG. 6 represents another embodiment of the hollow fiber membrane panel 10. In this embodiment, the membrane panel 10 includes a layer 42 of filler material is disposed between the interior sides of the layers 12, 14 of non-permeable material. The layer 42 of filler material supports the layers 12, 14 of non-permeable material in a spaced relationship to one another so as to define the flow channel 40 therebetween. The filler material of the layer 42 is permeable to fluid flow through the flow channel 40.

Furthermore, as shown in the left half of FIG. 6, both opposite end portions 22, 24 of the hollow fibers 20 can be open. Alternatively, as shown in the right half of FIG. 6, selected ones of the opposite end portions 22, 24 of the hollow fibers 20 can be closed.

Figure 7:
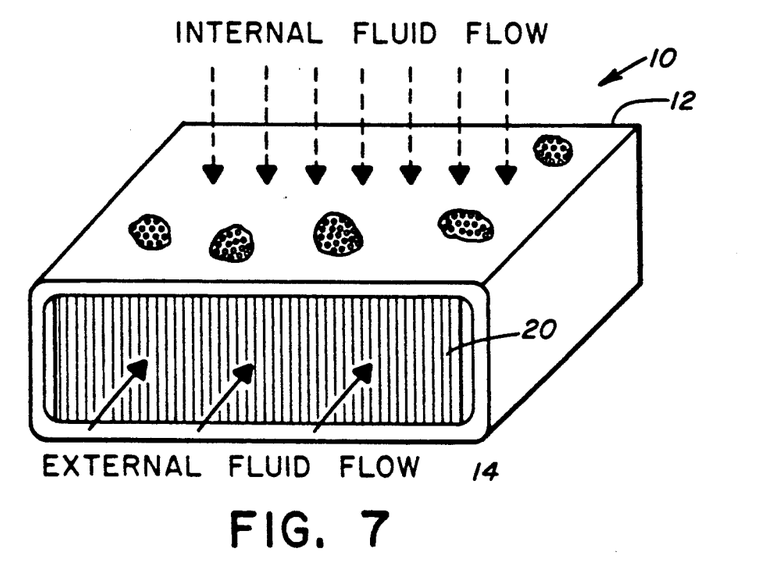
FIG. 7 is a schematic perspective view of the finished hollow fiber membrane panel of the present invention with arrows depicting the direction of internal and external flows relative to the hollow fibers.
Figure 8:
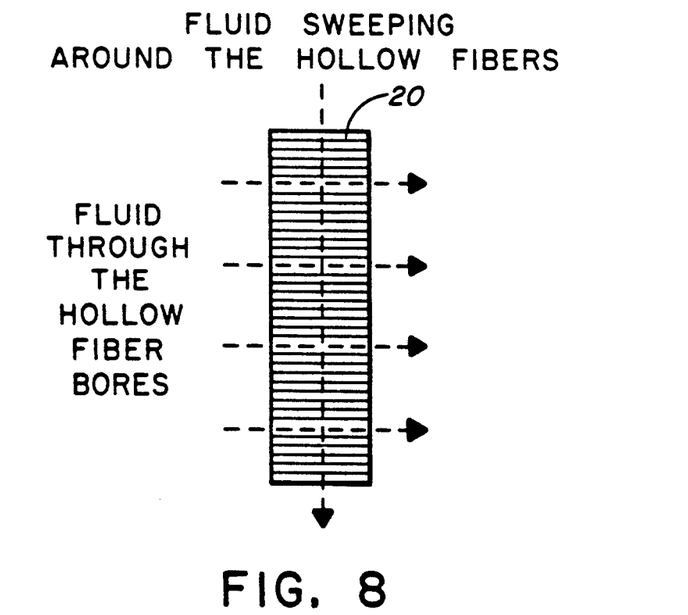
FIG. 8 is a schematic representation of the hollow fibers of the membrane panel with arrows depicting the direction of flows relative to the hollow fibers.

In FIGS. 7-10 the lengths of the hollow fibers are substantially exaggerated in length compared to the dimensions of other components of the panel 10 solely for the purpose of explaining the features of the panel. FIGS. 7 and 8 diagrammatically illustrates the final hollow fiber membrane panel 10 and the respective directions of internal and external flows relative to the hollow fibers 20 of the membrane panel 10. Mass transfer in the membrane panel 10 takes place by contacting different fluids through the highly extended surface areas of the walls of the hollow fibers 20. Because of the extremely high packing density of the hollow fibers 20 the panel 10 itself has a substantially self-supported construction.

Figure 9:
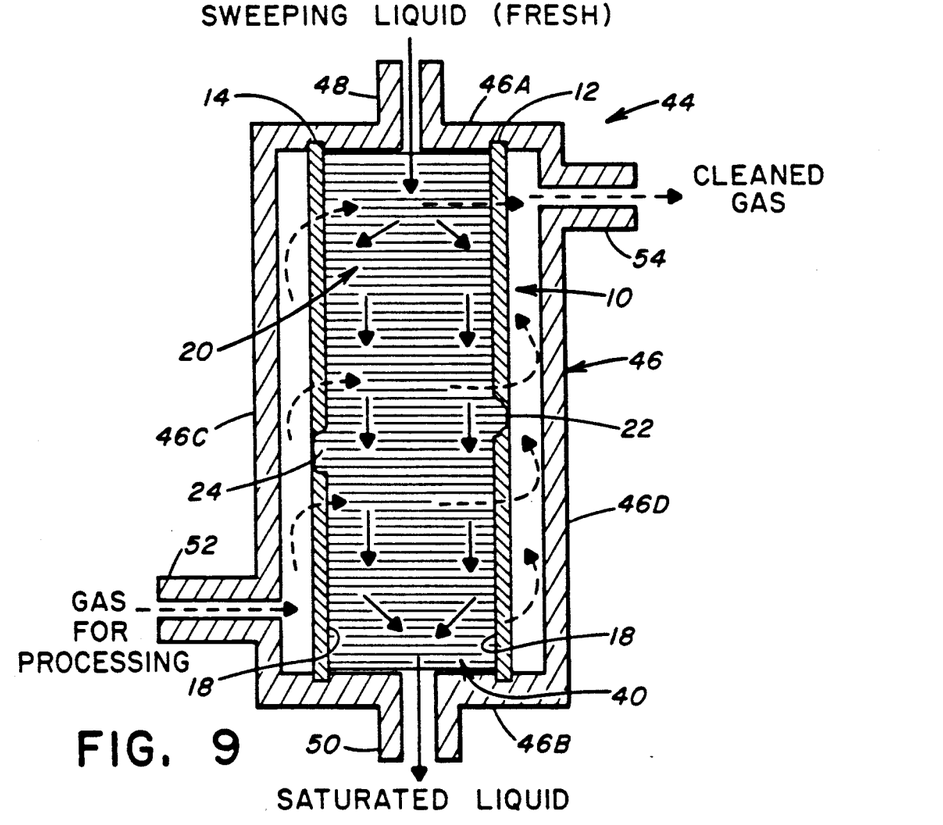
FIG. 9 is a schematic longitudinal sectional view of a gas-gas, gas-liquid or liquid-liquid contactor module in accordance with the present invention employing the hollow fiber membrane panel of the present invention.

Referring to FIG. 9, there is diagrammatically illustrated a contactor module 44 for use in a wide variety of low pressure gas-gas, gas-liquid and liquid-liquid mass transfer systems in accordance with the principles of the present invention. The contactor module 44 includes a hollow housing 46 having opposite end portions 46A, 46B and opposite side portions 46C, 46D extending between and interconnecting the opposite end portions 46A, 46B. The hollow housing 46 has an inlet port 48 defined through the one end portion 46A and an outlet port 50 defined through the other end portion 46B of the housing 46. The housing 46 also has an infeed port 52 defined through the one side portion 46C and a discharge port 54 defined through the other side portion 46D of the housing 46. The hollow fiber membrane panel 10 is disposed in the housing 46, extending between the opposite end portions 46A, 46B thereof and extending substantially parallel to and spaced from the opposite side portions 46C, 46D thereof. The panel 10 is mounted at opposite ends to the opposite end portions 46A, 46B of the housing 46 and extends substantially parallel to and are spaced from the opposite side portions 46C, 46D of the housing 46. The hollow fibers 20 which extend between and in generally transverse relationship to the layers 12, 14 of non-permeable material are disposed generally parallel to the opposite end portions 46A, 46B of the housing 46. The opposite end portions 22, 24 of the hollow fibers 20 encapsulated by the respective layers 12, 14 of non-permeable material are disposed in flow communication respectively with the infeed and discharge ports 52, 54 of the housing 46. The elongated portions 26 of the hollow fibers 20 which extend across the flow channel 40 and between the internal sides 18 of the respective layers 12, 14 of non-permeable material support the layers 12, 14 in the spaced relationship to one another. The flow channel 40 between the layers 12, 14 is disposed in flow communication respectively with the inlet and outlet ports 48, 50 of the housing 46.

Figure 10:
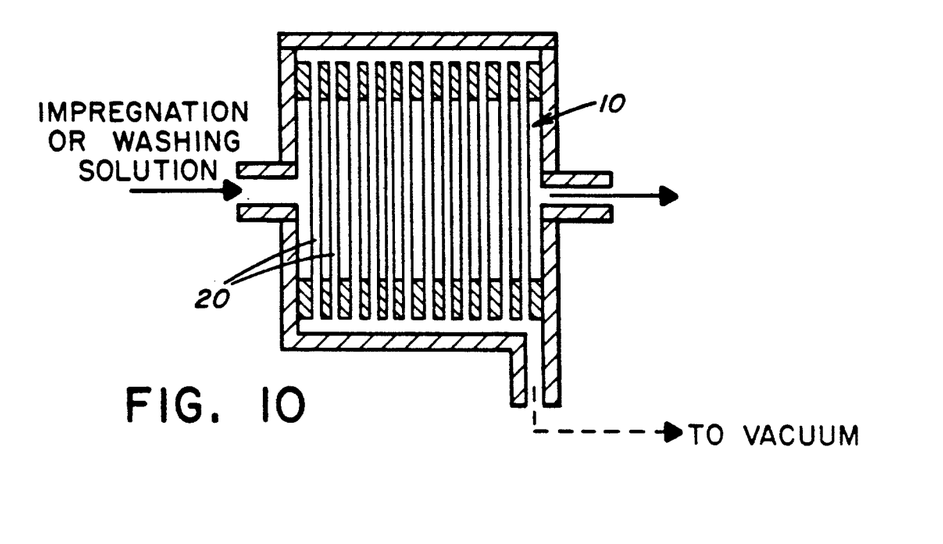
FIG. 10 is an illustration of a setup for carrying out the process of external impregnation and leaking removal of the hollow fibers within the membrane panel.

FIG. 10 illustrates an example of a setup for carrying out the process of external impregnation and leaking removal of the hollow fibers 20 within the membrane panel 10.

Table 1 is a comparison of the design and process parameters of membrane capillary systems for low pressure gas-liquid processes of prior art and of the present invention with those of a natural system (the human lung) for the cases of oxygen and carbon dioxide mass transfer.

TABLE 1

|  | Prior Art | Membrane Panel | Human Lung |
|---|---|---|---|
| Hollow fiber (capillary) internal diameters [$10^{-6}$ m] | 30–500 | 7–20 | 5–10 |
| Total thickness of the walls [$10^{-6}$ m] | 10–25 | 3–10 | 0.5–1.0 |
| Length of capillaries [cm] | 2–20 | 0.1–0.5 | 0.01–0.05 |
| Residence time for liquid phase [s] | 3–30 | 0.1–5.0 | 0.1–0.3 |
| Pressure drop in the system [mmHg] | 0–200 | 0–20 | 12 |
| Total exchange surface area [m$^2$] | 2–10 | 10–50 | 50–150 |
| Exchange area packing density [m$^2$/l] | 2–5 | 10–50 | 50–100 |
| Velocities of liquid flow in capillaries [cm/s] | 1–10 | 0.05–1.0 | 0.05–0.1 |
| Overall gas-liquid mass transfer coefficient K[cm/s]$10^{-3}$ | 0.01–0.1 | 0.05–1.0 | n.a. |
| Overall mass transfer times gas liquid interfacial area | 0.1–0.2 | 0.2–1.0 | n.a. |

TABLE 1-continued

| | Prior Art | Membrane Panel | Human Lung |
|---|---|---|---|
| Ka[l/s] | | | |

References
Prior art data taken for comparison from:
(1) Karoor and Sirkar. "Gas Absorption Studies in Microporous Hollow Fiber Membrane Modules", Ind. Eng. Chem. Res. 32. 674–704 (1993)
(2) Kreulen et al.. "Microporous Hollow Fibre Membrane Modules As Gas Liquid Contactors" Part 1 and Part 2, J. Membr. Sci. 78, 197–216 (1993) ibid. 78, 217–238 (1993)
Human lung data taken from Cooney, "Biomedical Engineering Principles: An Introduction To Fluid, Heat, And Mass Transport Processes", Marcel Dekker, Inc., New York (1976)

Industrial Applicability

The largest area of industrial application of the low pressure drop hollow fiber membrane panel 10 and contactor module 44 of the present invention is in environmental protection, especially in cleaning up of flue gases by contacting them with reactive or reverseably absorbing solutions. The membrane panel 10 presents a substantially large surface area for liquid contact with the flue gases which results in enhanced removal of the gaseous pollutants from the main stream and their concentration inside of the contacting liquid for easy post-removal handling and disposal. Another large environmental application is removal of trace organics from waste water by pervaporation. In this case, because of very small wall thickness of the membranes, it is possible to work with low cost homogeneous fibers. In another large environmental application the fibers can selectively transport organics from concentrated wastes which cannot be directly treated with bacteria making possible biotechnological treatment of this type of waste water.

Another large industrial application of the hollow fiber membrane panel 10 and contactor module 44 of the present invention is in removal of traces of oxygen and carbon dioxide from boiler water, especially from water to be used for steam production in power plants.

Removal of gases from salt water is also desirable in large-scale desalination plants working on the basis of multiple flash evaporation, as traces of oxygen and carbon dioxide in combination with high concentrations of salts increase the rates of corrosion of heat transfer surfaces. It is especially important, for example, in multiple flash evaporation if applied to desalination of coal mine waters.

Also, the design of the membrane panel 10 and contactor panel 44 can be broadly applied in commercial systems for gas separation at low feeding pressures, for example in air separation with vacuum as the driving force or in carbon removal from mixtures with methane (landfill and biogas) or in natural gas upgrading. It is only necessary to modify the membrane properties to achieve necessary selectivity to separate components. But that can be done by post-treatment of the membrane panels 10, such as by coating the external or internal surfaces or by impregnating the pores in the fiber walls.

Another large area is medical applications in artificial blood oxygenators and artificial kidneys. Table 1 presented above demonstrates the degree to which the membrane panel 10 of the present invention emulates the natural system compared to prior art approaches and by so doing realizes the efficiencies of the natural system.

Still another area of application is food processing, especially oxygen removal for prolonging storage and saturation by carbon dioxide in producing carbonated soft drinks.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A hollow fiber membrane panel, comprising:
   (a) a pair of layers of textile material, each of said layers of textile material being formed of interwoven strands of material and defining supporting substrates;
   (b) a pair of layers of non-permeable material each encapsulating separately one of said supporting substrates defined by said layers of textile material, each of said non-permeable material layers having opposite external and internal sides; and
   (c) a multiplicity of hollow fibers of permeable material extending between and in generally transverse relationship to said layers of non-permeable material and said layers of textile material encapsulated by said layers of non-permeable material, each of said hollow fibers having a pair of spaced opposite end portions extending between said interwoven strands of said layers of textile material and an elongated portion extending between and interconnecting said opposite end portions, said opposite end portions of said hollow fibers being encapsulated by said respective layers of non-permeable material between said interwoven strands of said layers of textile material and open at said external sides thereof, said elongated portions of said hollow fibers having elongated internal bores providing flow communication between said open opposite end portions of said hollow fibers, said elongated portions of said hollow fibers extending between said internal sides of said respective layers of non-permeable material so as to support said layers of non-permeable material in a spaced relationship to one another and define a flow channel therebetween with said elongated portions of said hollow fibers extending across said flow channel and transversely to the direction of flow through said channel, the lengths of said elongated portions of said hollow fibers being substantially less than each of the length and width dimensions of said layers of non-permeable material.

2. The panel of claim 1 wherein each of said layers of textile material is formed of interwoven warp and weft strands of material.

3. The panel of claim 1 wherein each of said layers of non-permeable material is formed of a plurality of sublayers of different materials.

4. The panel of claim 1 wherein each of said layers of non-permeable material is formed of an adhesive material.

5. The panel of claim 1 wherein said hollow fibers are arranged as individual hollow fibers.

6. The panel of claim 1 wherein said hollow fibers are arranged as bundles of individual hollow fibers extending generally parallel to one another.

7. The panel of claim 1 wherein said hollow fibers are arranged as bundles of individual hollow fibers which are helically twisted about one another.

8. The panel of claim 2 wherein said hollow fibers are coated with a material which is acceptable for contact with biological fluids.

9. The panel of claim 1 wherein said hollow fibers are coated with a material which changes surface properties of said fibers.

10. The panel of claim 1 wherein each hollow fibers are coated with a material which changes the selectivity of the material of said fibers.

11. The panel of claim 1 wherein each of said hollow fibers has a length falling within a range of from about 0.1 to 5.0 centimeters.

12. A hollow fiber membrane panel, comprising:
   (a) a pair of layers of textile material, each of said layers of textile material being formed of interwoven strands of material and defining a supporting substrate;
   (b) a pair of layers of non-permeable material each encapsulating separately one of said supporting substrates defined by said layer of textile material, each of said non-permeable material layers having opposite external and internal sides;
   (c) a layer of filler material disposed between said interior sides of said layers of non-permeable material and said layers of textile material encapsulated by said layers of non-permeable material, said layer of filler material supporting said layers of non-permeable material with said respective layers of textile material encapsulated therein in a spaced relationship to one another so as to define a flow channel therebetween, said filler material being permeable to fluid flow through said flow channel; and
   (d) a multiplicity of hollow fibers of permeable material extending between and in generally transverse relationship to said layers of non-permeable material and textile material and said layer of filler material disposed between said layers of non-permeable material and textile material, each of said hollow fibers having a pair of spaced opposite end portions extending between said interwoven strands of said layers of textile material and an elongated portion extending between and interconnecting said opposite end portions, said opposite end portions of said hollow fibers being encapsulated by said respective layers of non-permeable material between said interwoven strands of said layers of textile material and open at said external sides thereof, said elongated portions of said hollow fibers having elongated internal bores providing flow communication between said open opposite end portions of said hollow fibers, said elongated portions of said hollow fibers extending through said layer of filler material and between said internal sides of said respective layers of non-permeable material and across said flow channel therebetween transversely to the direction of flow through said channel, the lengths of said elongated portions of said hollow fibers being substantially less than each of the length and width dimensions of said layers of non-permeable material.

13. The panel of claim 12 wherein each of said layers of non-permeable material is formed of a plurality of sublayers of different materials.

14. The panel of claim 12 wherein each of said layers of non-permeable material is formed of an adhesive material.

15. The panel of claim 12 wherein said hollow fibers are arranged as individual hollow fibers.

16. The panel of claim 12 wherein said hollow fibers are arranged as bundles of individual hollow fibers extending generally parallel to one another.

17. The panel of claim 12 wherein said hollow fibers are arranged as bundles of individual hollow fibers which are helical twisted about one another.

18. The panel of claim 12 wherein said hollow fibers are coated with a material which is acceptable for contact with biological fluids.

19. The panel of claim 12 wherein said hollow fibers are coated with a material which changes surface properties of said fibers.

20. The panel of claim 12 wherein said hollow fibers are coated with a material which changes the selectivity of the material of said fibers.

21. The panel of claim 12 wherein each of said hollow fibers has a length falling within a range of from about 0.1 to 5.0 centimeters.

22. The panel of claim 12 wherein said layer of filler mealier includes a bed of catalyst material.

23. The panel of claim 12 wherein said layer of filler material includes a colony of bacteria.

24. The panel of claim 12 wherein said layer of filler material includes a bed of adsorbent material.

25. A contactor module for use in low pressure gas-gas, gas-liquid and liquid-liquid mass transfer systems, said contactor module comprising;
   (a) a hollow housing having opposite end portions and opposite side portions extending between and interconnecting the opposite end portions;
   (b) an inlet port defined through one of the end portions and an outlet port defined through the other of the end portions of the housing;
   (c) an infeed port defined through one of the side portions and a discharge port defined through the other of the side portions of the housing; and
   (d) a hollow fiber membrane panel disposed in the housing, said hollow fiber membrane panel including
      (i) a pair of layers of textile material, each of said layers of textile material being formed of interwoven strands of material and defining supporting substrates,
      (ii) a pair of layers of non-permeable material each encapsulating separately one of said supporting substrates defined by said layers of textile material, each of said non-permeable material layers having opposite external and internal sides, and
      (iii) a multiplicity of hollow fibers of permeable material extending between and in generally transverse relationship to the layers of non-permeable material and said layers of textile material encapsulated by said layers of non-permeable material, each of said hollow fibers having a pair of spaced opposite end portions extending between said interwoven strands of said layers of textile material and an elongated portion extending between and interconnecting the opposite end portions, said opposite end portions of the hollow fibers being encapsulated by said respective layers of non-permeable material between said interwoven strands of said layers of textile material and being open at said external sides thereof, said opposite end portions of said hollow fibers being disposed in flow communication respectively with said infeed and discharge ports of said housing, said elongated portions of said hollow fibers extending between said internal sides of said respective layers of non-permeable material and having elongated internal bore providing flow communication between said open opposite end portions of said hollow fibers, the lengths of said elongated portions of said hollow fibers being substantially less than each of the length and width dimensions of said layers of non-permeable material, said layers of non-permeable material being supported in a spaced relationship to one another by said elongated portions of said hollow fibers so as to define a flow channel therebetween being disposed in flow communication respectively with said inlet and outlet ports of said housing, said elongated portions of said hollow fibers extend across aid flow channel and transversely to the direction of flow through said channel.

26. The module of claim 25 wherein each of said layers of textile material is formed of interwoven warp and weft strands of material.

27. The module of claim 25 wherein each of said layers of non-permeable material is formed of a plurality of sublayers of different materials.

28. The module of claim 25 wherein each of said layers of non-permeable material is formed of an adhesive material.

29. The module of claim 25 wherein said hollow fibers are arranged as individual hollow fibers.

30. The module of claim 25 wherein said hollow fibers are arranged as bundles of individual hollow fibers extending generally parallel to one another.

31. The module of claim 25 wherein said hollow fibers are arranged as bundles of individual hollow fibers which are helical twisted about one another.

32. The module of claim 25 wherein each of said hollow fibers has a length falling within a range of from about 0.1 to 5.0 centimeters.

33. The panel of claim 12 wherein each of said layers of textile materials is formed of interwoven warp and weft strands of material.

34. A hollow fiber membrane panel, comprising:
(a) a pair of spaced layers of textile material;
(b) a pair of layers of non-permeable material each encapsulating separately one of said layers of textile material and having opposite external and internal sides; and
(c) a multiplicity of hollow fibers of permeable material having elongated internal bores providing flow communication therethrough, said hollow fibers having opposite end portions encapsulated by said respective layers of non-permeable material between said interwoven strands of said layers of textile material and being open at said external sides of said layers of non-permeable material, said hollow fibers also having elongated portions extending between said opposite end portions and between and in generally transverse relationship to said layers of textile material with said elongated internal bores therein providing flow communication between said open opposite end portions of said hollow fibers, said elongated portions also extending between said internal sides of said respective layers of non-permeable materials so as to support said layers of non-permeable material in a spaced relationship to one another and define a flow channel therebetween with said elongated portions of said hollow fibers extending across said flow channel and transversely to the direction of flow through said channel, the lengths of said elongated portions of said hollow fibers being substantially less than each of the length and width dimensions of said layers of non-permeable material;
(d) said layers of textile material and said multiplicity of hollow fibers being formed by concurrently weaving pluralities of warp and weft strands to provide said pair of spaced layers of textile material and weaving a facing hollow fiber transversely with said warp and weft strands to provide said multiplicity of hollow fibers;
(e) said layers of non-permeable material and said hollow fibers having said open opposite end portions being formed by applying a non-permeable adhesive material to said textile layers and adjacent portions of said hollow fibers and removing an outer portion of said adhesive material on each of said textile layers and said adjacent portions of said hollow fibers therewith so as to expose and open said opposite end portions of said hollow fibers between said interwoven strands of said layers of textile material at said external sides of said layers of non-permeable material.

35. The panel of claim 34 wherein first and second pluralities of said multiplicity of hollow fibers are respectively provided with different first and second selectivities.

36. The panel of claim 34 wherein said hollow fibers of said first plurality provided with said first selectivity are open at only one of said opposite end portions of said fibers and said hollow fibers of said second plurality provided with said second selectivity are open at only the other of said opposite end portions of said fibers.

37. The panel of claim 34 wherein each of said layers of non-permeable material is formed of an adhesive material.

38. The panel of claim 34 wherein said hollow fibers are arranged as individual hollow fibers.

39. The panel of claim 34 wherein said hollow fibers are arranged as bundles of individual hollow fibers extending generally parallel to one another.

40. The panel of claim 34 wherein said hollow fibers are arranged as bundles of individual hollow fibers which are helical twisted about one another.

41. The panel of claim 34 wherein said hollow fibers are coated with a material which is acceptable for contact with biological fluids.

42. The panel of claim 34 wherein said hollow fibers are coated with a material which changes surface properties of said fibers.

43. The panel of claim 34 wherein said hollow fibers are coated with a material which changes the selectivity of the material of said fibers.

44. The panel of claim 34 wherein each of said hollow fibers has a length falling within a range of from about 0.1 to 5.0 centimeters.

45. A method of forming a hollow fiber membrane panel, comprising the steps of:
(a) forming a pair of spaced layers of textile material of interwoven strands and a multiplicity of hollow fibers of permeable material having elongated internal bores providing flow communication therethrough, said hollow fibers extending about and between and in generally transverse relationship to said interwoven strands of said layer of textile material by concurrently weaving pluralities of warp and weft strands to provide said spaced layers of textile material and weaving a facing hollow fiber transversely with said warp and weft strands to provide said multiplicity of hollow fibers; and (b) forming a pair of spaced layers of non-permeable material by
  (i) applying a non-permeable adhesive material to said textile layers and adjacent portions of said facing hollows fibers so as to encapsulate separately each of said layers of textile material and adjacent opposite end portions of said hollow fibers between said interwoven strands of said layers of textile material such that elongated portions of said hollow fibers extending between said opposite end portions support said layers of non-permeable material in a spaced relationship to one another and define a flow channel therebetween with said elongated portions of said hollow fibers extending across said flow channel and transversely to the direction of flow through said channel, the lengths of said elongated portions of said hollow fibers being substantially less than each of the length and width dimensions of said layers of non-permeable material, and
  (ii) removing an outer portion of said non-permeable adhesive material and said adjacent portions of said hollow fiber therewith so as to expose and open said opposite end portions of said hollow fibers located between said interwoven strands of said layers of textile material at said external sides of said layers of non-permeable material.

* * * * *